United States Patent
Seol et al.

(10) Patent No.: US 8,565,674 B2
(45) Date of Patent: Oct. 22, 2013

(54) PORTABLE TERMINAL COMPRISING NEAR FIELD COMMUNICATION MODULE AND METHOD FOR OPERATING THE SAME

(75) Inventors: Dong Beom Seol, Seoul (KR); Jang Hyun Nam, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 719 days.

(21) Appl. No.: 12/492,544

(22) Filed: Jun. 26, 2009

(65) Prior Publication Data

US 2009/0325488 A1 Dec. 31, 2009

(30) Foreign Application Priority Data

Jun. 30, 2008 (KR) .................. 10-2008-0062534

(51) Int. Cl.
- *H04B 5/00* (2006.01)
- *H04M 1/00* (2006.01)
- *H04Q 5/22* (2006.01)
- *H03G 3/00* (2006.01)
- *H03G 3/20* (2006.01)

(52) U.S. Cl.
USPC ....... 455/41.1; 455/550.1; 340/10.1; 330/127

(58) Field of Classification Search
USPC ............ 455/41.1, 41.2, 550.1, 574; 340/10.1, 340/10.33, 10.34, 10.4; 330/127, 207 R, 310
See application file for complete search history.

(56) References Cited

U.S. PATENT DOCUMENTS

| | | | |
|---|---|---|---|
| 6,799,059 B1* | 9/2004 | Austin et al. .................. 455/561 |
| 2005/0215205 A1* | 9/2005 | Rofougaran .................... 455/78 |
| 2006/0214799 A1* | 9/2006 | Yamada ...................... 340/572.7 |
| 2009/0011706 A1* | 1/2009 | Wilson et al. ................. 455/41.1 |
| 2009/0237218 A1* | 9/2009 | Kim ............................. 340/10.3 |
| 2010/0279606 A1* | 11/2010 | Hillan et al. ................. 455/41.1 |
| 2011/0111695 A1* | 5/2011 | Shameli et al. .............. 455/41.1 |
| 2011/0171951 A1* | 7/2011 | Kim et al. .................. 455/422.1 |
| 2012/0236960 A1* | 9/2012 | Muhammad .................. 375/295 |
| 2013/0112747 A1* | 5/2013 | McFarthing .................. 235/439 |

FOREIGN PATENT DOCUMENTS

KR 10-0769540 B1 10/2007

* cited by examiner

*Primary Examiner* — Andrew Wendell
(74) *Attorney, Agent, or Firm* — Jefferson IP Law, LLP

(57) ABSTRACT

A portable terminal operable in a tag mode a read mode and a method for operating the terminal are provided. The portable terminal includes a Near Field Communication (NFC) module including a plurality of amplifiers, a mode selector for controlling the plurality of amplifiers to perform a power supplying operation and a power cutting operation, a controller for outputting a control signal to the mode selector according to the tag mode and the read mode, and a selection signal line for transmitting the control signal to the mode selector.

15 Claims, 5 Drawing Sheets

PORTABLE TERMINAL COMPRISING NEAR FIELD COMMUNICATION MODULE AND METHOD FOR OPERATING THE SAME

PRIORITY

This application claims the benefit under 35 U.S.C. §119 (a) of a Korean patent application filed in the Korean Intellectual Property Office on Jun. 30, 2008 and assigned Serial No. 10-2008-0062534, the entire disclosure of which is hereby incorporated by reference.

BACKGROUND OF THE INVENTION

1. Field of the Invention

The present invention relates to communication systems. More particularly, the present invention relates to a portable terminal that can be operated according to whether a Near Field Communication (NFC) module is operated in a transmitting process or a receiving process, and a method for operating the portable terminal.

2. Description of the Related Art

A Near Field Communication (NFC) module is installed in portable terminals and includes a reader, where the reader reads data from a tag of another portable terminal or downloads new data by generating electromagnetic waves, if the portable terminal is located close to another portable terminal. An NFC system using the NFC module has been applied to a traffic card payment system, a food bill payment system, a digital door lock, and the like.

Recently, portable terminals have been released that include an NFC module with both a tag function and a reader function. The portable terminals having the tag function and the reader function can be operated in a tag mode or a reader mode according to a user's setting. However, conventional portable terminals operate their antenna in different ways according to whether they are operating in the tag mode or the read mode. Therefore, the conventional portable terminals tune the antenna so that it can be operated in both the tag mode and the reader mode. Thus, the conventional portable terminals cause a relatively large amount of standby consumption power in the tag mode and cannot perform an optimal antenna operation for a reader in the read mode.

Therefore, a need exists for a portable terminal that minimizes power consumption in a tag mode and performs an optimal antenna operation in a read mode.

SUMMARY OF THE INVENTION

An aspect of the present invention is to address at least the above-mentioned problems and/or disadvantages and to provide at least the advantages described below. Accordingly, an aspect of the present invention is to provide a portable terminal, which includes a Near Field Communication (NFC) module and an antenna assembly that is operable both in a tag mode and a read mode, for minimizing power consumption and providing an optimal environment for the antenna assembly.

Another aspect of the present invention is to provide a method for operating the portable terminal.

In accordance with an aspect of the present invention, a portable terminal operable in a tag mode and a read mode is provided. The portable terminal includes a Near Field communication (NFC) module including a plurality of amplifiers, a mode selector for controlling the plurality of amplifiers to perform a power supplying operation and a power cutting operation, a controller for outputting a control signal to the mode selector according to the tag mode and the read mode, and a selection signal line for transmitting the control signal to the mode selector.

In accordance with another aspect of the present invention, a method for operating a portable terminal in a tag mode, wherein the portable terminal includes a Near Field Communication (NFC) module including a first amplifier and a second amplifier, and an antenna assembly including a first antenna module and a second antenna modules is provided. The method includes cutting power supplied to the second amplifier, and floating the second antenna.

In accordance with still another aspect of the present invention, a method for operating a portable terminal in a read mode, wherein the portable terminal includes a Near Field Communication (NFC) module including a first amplifier and a second amplifier, and an antenna assembly including a first antenna module and a second antenna module is provided. The method includes supplying power to the first amplifier and the second amplifier, and coupling the first antenna module and the second antenna module to ground.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

Figure 1:
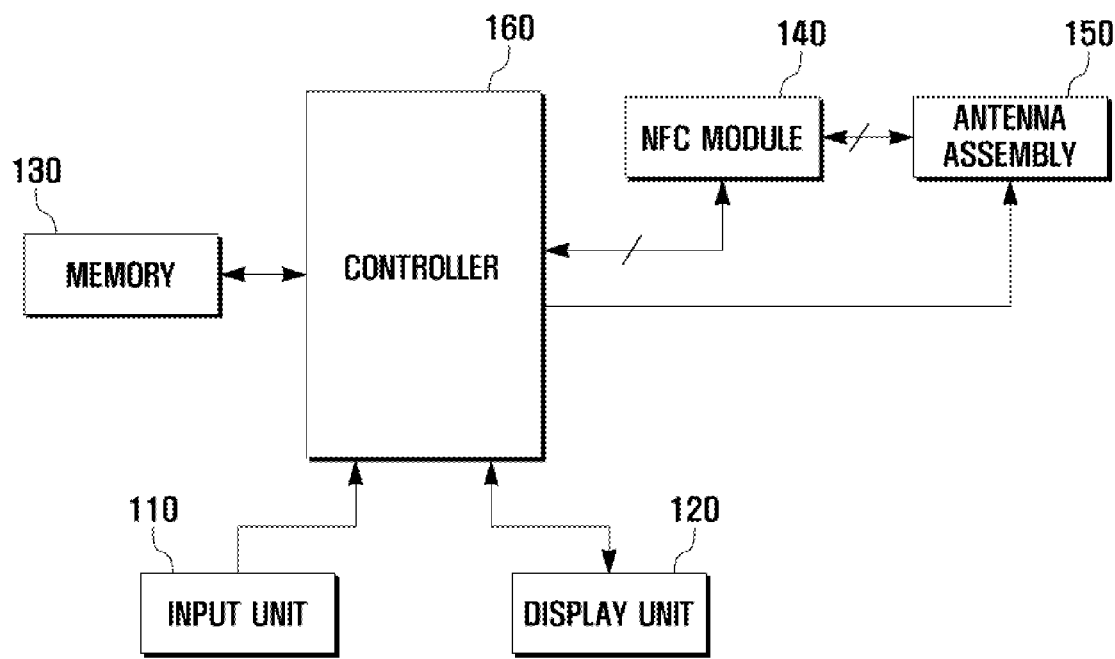
FIG. 1 is a schematic block diagram illustrating a portable terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Prior to explaining exemplary embodiments of the present invention, terminologies will be defined for the present description below.

A Near Field Communication (NFC) module refers to a communication module including both a tag function and a read function that may be operated in both a tag mode and a read mode. The NFC module includes a tag and a reader. The tag of the NFC module (i.e., an NFC tag) includes an IC chip (i.e., a micro-chip), a capacitor for accumulating power and an LC circuit serving as an antenna. The reader of the NFC module (i.e., an NFC reader) includes a Radio Frequency (RF) module and an antenna. An inductor and a capacitor forming the LC circuit of a portable terminal serve as an RF interface and generate electric power, induced by magnetic fields, i.e., RF signals transmitted from a reader of another portable terminal, so that the NFC tag may exchange data with the reader of the other portable terminal. The NFC tag and the NFC reader of the portable terminal each include an antenna to communicate with a tag or a reader included in the other portable terminal. The tag and the reader may include conductive metals, such as copper, and the like.

In the following description, the present invention will be described with respect to a case where the portable terminal is set to be operated in the read mode, if the NFC module is operated in the tag mode. It should be understood that the tag and the reader included in the NFC module may be implemented to include various types and number of components, according to an engineers' design intention. Therefore, the present invention is not limited by the components of the tag and the reader.

FIG. 1 is a schematic block diagram illustrating a portable terminal according to an exemplary embodiment of the present invention.

Referring to FIG. 1, the portable terminal includes an input unit 110, a display unit 120, a memory 130, an NFC module 140, an antenna assembly 150 and a controller 160.

Although the portable terminal according to an exemplary embodiment of the present invention illustrates elements related to an operation of the NFC module 140 and the antenna assembly 150 in FIG. 1, it should be understood that the portable terminal may further include an audio processing unit for processing audio signals, a camera, an Moving Picture Expert Experts Group (MPEG)-1 Audio Layer 3 (MP3) processing unit for playing media files, a broadcast receiving module, a Global Positioning System (GPS) module, and the like.

The portable terminal allows the controller 160 to control the NFC module 140 and the antenna assembly 150 in such a way that an antenna module operation may be performed in a tag mode and a read mode, respectively and differently. Therefore, the controller 160 may properly operate the antenna assembly 150 according to the modes. Each of the portable terminal elements is explained in detail below.

The input unit 110 includes a plurality of input keys and function keys for inputting numerical or character information and setting a variety of functions. The function keys include direction keys, side keys, shortcut keys, and the like, which are set to perform specific functions. The input unit 110 also generates key signals related to a user's setting and the control of the portable terminal, and outputs the key signals to the controller 160.

More particularly, according to a user's input, the input unit 110 generates a key input signal for setting the NFC module 140 to the tag mode or the read mode, a power control signal for supplying or cutting power to the portable terminal, an input signal for scanning the other portable terminals with a tag when it is in the read mode, and the like.

The display unit 120 displays a variety of menus of the portable terminal. The display unit 120 also displays information input by the user or information provided to the user. That is, the display unit 120 displays a variety of screens according to the use of the portable terminal, for example, a standby screen, a menu screen, a message writing screen, a call screen, and the like.

More particularly, the display unit 120 may display an initialization screen when the portable terminal is turned on, a screen related to a setting state of the NFC module 140, and the like. The display unit 120 may also display icons and indicators, such as an icon indicating a remaining amount of battery power.

The display unit 120 may display a list of tags that may be acquired by scanning peripheral systems, if the portable terminal is operated in the read mode. The display unit 120 may also display a screen for setting the tag mode and the read mode. In addition, the display unit 120 may display screens for completing the tag mode or the read mode setting, in response to an input signal of the input unit 110.

The memory 130 stores an application program required to operate the portable terminal and a program for operating the NFC module 140. The NFC module operating program is loaded and enabled to operate the NFC module 140, according to the control of the controller 160. The NFC module operating program supports the display unit 120 to display a screen for setting the portable terminal to the tag mode or the read mode, in response to an input signal from the input unit 110. The NFC module 140, in response to a user setting, supports the setting of the NFC module 140 and the antenna assembly 150 so that the NFC module 140 and the antenna assembly 150 may be operated in the tag mode and operated in the read mode.

The memory 130 includes a program area and a data area. The program area stores an Operating System (OS) for booting the portable terminal, a program for operating the NFC module 140, and application programs for other optional functions, such as a camera function, an audio playback function, an image or moving image playback function, and the like. In response to the user's request, the controller 160 activates application programs and provides functions corresponding thereto to the user. The NFC module operating program may be executed according to set information for controlling states of setting the NFC module 140, while the portable terminal is operating in the tag mode, and the antenna assembly 150 to be operated in the tag mode. The NFC module operating program may also be executed according to set information for controlling states of setting the NFC module 140, while the portable terminal is operating in the read mode and the antenna assembly 150 to be operated in the read mode. The NFC module operating program sets states of the NFC module 140 and the antenna assembly 150, in response to the input signals from the input unit 110, based on the set information.

The data area of the memory 130 stores data generated as the portable terminal is operated. The data includes user data and information corresponding to the user data, where the user data is related to a variety of optional functions, for example, images or moving images captured by a camera of the portable terminal, phone book data, audio data, contents, and the like. More particularly, the data area stores set information regarding the NFC module 140 and the antenna assembly 150, and provides the set information to the controller 160 when the NFC module operating program is executed. Furthermore, the data area may temporarily store tag information regarding the other portable terminals, which is acquired while the portable terminal is operating in the read mode.

The NFC module 140 supports the tag mode and the read mode according to the setting of the portable terminal. For example, if the portable terminal, set to be in the tag mode is turned off, the NFC module 140 receives power from the power supply of the portable terminal and is operated in the tag mode. The NFC module 140 includes a tag. Although power is not supplied to support the functions of the portable terminal, such as a call function, a file playback function, and the like, and thus the portable terminal is operated in the tag mode, the portable terminal may be designed to maintain a path through which the NFC module 140 may receive power from the power supply. More particularly, the controller 160 controls power that is supplied to elements for transmitting and receiving signals, so that the NFC module 140 may use power differently in the tag mode and the read mode. The process of using power differently in the tag mode and the read mode will be described below with reference to FIG. 2.

The antenna assembly 150 transmits signals outside the portable terminal according to the controls of the NFC module 140. The antenna assembly 150 also receives signals from outside the portable terminal and outputs the signals to the NFC module 140. If the portable terminal is operated in the tag mode, the antenna assembly 150 receives a magnetic field signal from another external device and outputs the magnetic field signal to the NFC module 140. If the portable terminal is operated in read mode, the antenna assembly 150 transmits a particular magnetic field signal outside the portable terminal in order to scan a tag of the other device, according to the control of the controller 160. The antenna assembly 150 is designed to have different operating characteristics when in the tag mode and in the read mode. For example, the antenna assembly 150 operates a first antenna in the tag mode and the first antenna and a second antenna in the read mode, according to the control of the NFC module 140. In an exemplary implementation, the antenna assembly 150 is implemented by a winding-type antenna. The structure of the antenna assembly 150 will be explained below with reference to FIG. 3.

The controller 160 controls a signal flow among blocks in the portable terminal. That is, the controller 160 outputs control signals to the blocks so that the portable terminal may perform corresponding functions. More particularly, the controller 160 may control the state settings of the NFC module 140 and the antenna assembly 150, so that the NFC module 140 may be operated in the tag mode, according to a user's setting. The controller 160 may also control the state settings of the NFC module 140 and the antenna assembly 150, so that the NFC module 140 may be operated in the read mode.

As described above, the portable terminal, according to a user's setting, may set different physical states of the NFC module 140 and the antenna assembly 150 when they are operated in the tag mode and in the read mode (i.e., physical states of the NFC module 140 and the antenna assembly 150 operated in the tag mode differ from the physical states in the read mode). Therefore, the portable terminal may minimize power supply for a tag mode operation and optimize signal transmission and reception for a read mode operation.

Figure 2:
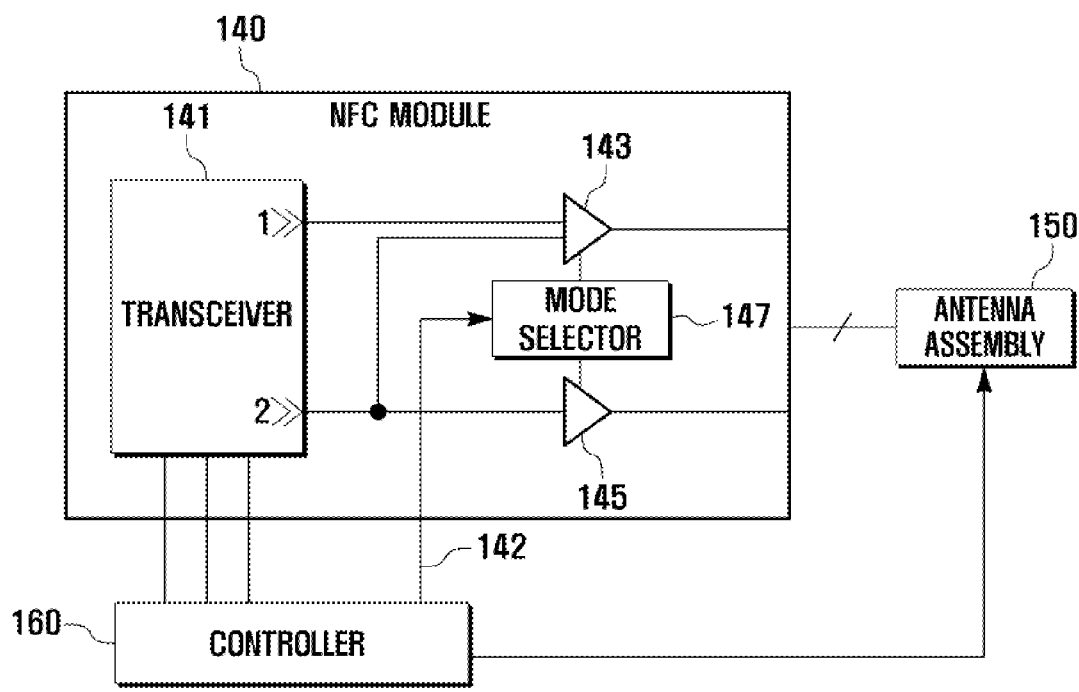
FIG. 2 is a detailed schematic block diagram illustrating a Near Field Communication (NFC) module according to an exemplary embodiment of the present invention.

FIG. 2 is a detailed schematic block diagram illustrating an NFC module 140 according to an exemplary embodiment of the present invention.

Referring to FIG. 2, the NFC module 140 includes a transceiver 141, a first amplifier 143, a second amplifier 145 and a mode selector 147. The NFC module 140 may further include a Radiating Edges-Coupling (REC) port for supporting characteristics of radiating edges.

The transceiver 141 includes a first port 1 for receiving a signal in the tag mode and a second port 2 for outputting and receiving a signal in the read mode. The first port 1 is connected to the first amplifier 143. The second port 2 is connected to the first amplifier 143 and the second amplifier 145. The transceiver 141 further includes signal lines for outputting and receiving signals to and from the controller 160.

The first amplifier 143 connects its input ports to the first port 1 and the second port 2 of the transceiver 141 and its output port to the antenna assembly 150. The first amplifier 143 receives power from the power supply. The first amplifier 143 serves to amplify the signals of the first port 1 and the second port 2. That is, the first amplifier 143 amplifies the signal of the first port 1 while the transceiver 141 is operating in the tag mode. Similarly, the first amplifier 143 amplifies the signal of the second port 2 while the transceiver 141 is operating in the read mode.

The second amplifier 145 connects its input port to the second port 2 of the transceiver 141 and its output port to the antenna assembly 150. The second amplifier 145 receives power from the power supply. The second amplifier 145 amplifies the signal of the second port 2 while the transceiver is operating in the read mode.

The mode selector 147 has a selecting signal line connected to the controller 160. The mode selector 147 is connected to the first amplifier 143 and the second amplifier 145. The mode selector 147 controls power supplied to the first amplifier 143 and the second amplifier 145, according to the control of the controller 160. That is, when the NFC module 140 is operated in the tag mode, the mode selector 147 cuts power supplied to the second amplifier 145, thereby allowing the first amplifier 143 to be operated. When the NFC module 140 is operated in the read mode, the mode selector 147 allows power to be supplied to the first amplifier 143 and the second amplifier 145, thereby allowing both the first amplifier 143 and the second amplifier 145 to be operated. An exemplary embodiment of the present invention may be modified in such a way that, since the first amplifier 143 is operated in both the tag mode and the read mode, the mode selector 147 includes a signal line for controlling power supplied to the second amplifier 145.

As described above, since power of the amplifiers connected to the respective ports may be controlled according to whether the NFC module 140 is operated in the tag mode or the read mode, proper power supply may be achieved according to the modes. If the portable terminal is operated in the tag mode, the portable terminal may receive a relatively strong magnetic field signal from the other portable terminal that is operating in the read mode. That is, when the portable terminal is close to the other portable terminal serving as a reader within a certain range of distance, the portable terminal may be operated in the tag mode using minimum power. Therefore, since the NFC module 140 allows power to be supplied to the first amplifier to maintain the tag mode, the NFC module 140 may save the power that the second amplifier consumes to maintain the tag mode.

Meanwhile, if the portable terminal is operated in the read mode, the portable terminal needs to transmit a magnetic field signal to the outside to detect a tag of the portable terminal. Accordingly, a power supplying process may be properly performed. Therefore, the NFC module 140 may allow power to be supplied to the first and the second amplifier, so that the portable terminal may properly transmit a magnetic field signal to the outside.

Figure 3:
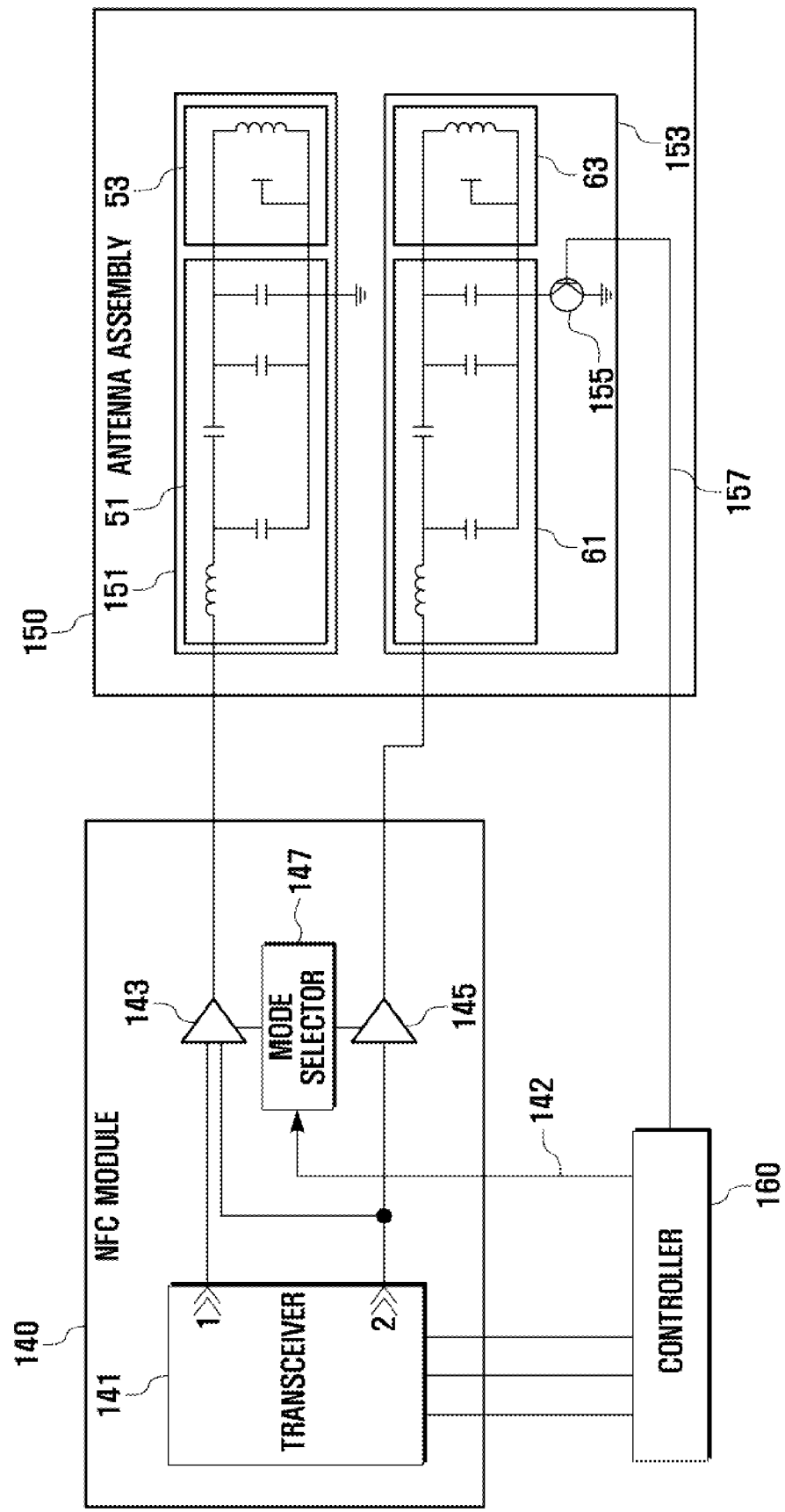
FIG. 3 is a detailed schematic block diagram illustrating an antenna assembly according to an exemplary embodiment of the present invention.

FIG. 3 is a detailed schematic block diagram illustrating an antenna assembly according to an exemplary embodiment of the present invention.

Referring to FIG. 3, the antenna assembly 150 includes a first antenna module 151, a second antenna module 153 and a switch 155.

The first antenna module 151 is located between the first amplifier 143 of the NFC module 140 and a ground terminal. The first antenna module 151 receives a signal from the first amplifier 143 and radiates a magnetic field signal into the air. The first antenna module 151 also receives a signal for detecting a tag of the other portable terminal from outside and outputs the signal to the NFC module 140. The first antenna module 151 includes a first filter part 51 and a first antenna 53. The first filter part 51 includes a plurality of capacitors and an inductor. The first antenna 53 may be a winding-type antenna.

The second antenna module 153 is located between the second amplifier 145 of the NFC module 140 and the switch 155. The second antenna module 153 receives a signal from the second amplifier 145 and radiates a magnetic field signal into the air. The second antenna module 153 also receives a magnetic field signal from the outside and outputs the magnetic field signal to the NFC module 140. The second antenna module 153 includes a second filter part 61 and a second antenna 63. The second filter part 61 includes a plurality of capacitors and an inductor. The second antenna 63 may be the same winding-type antenna as the first antenna 53.

The switch 155 has a control signal line 157 connected to the controller 160. The switch 155 floats or grounds the second antenna module 153 according to the control of the controller 160. That is, if the portable terminal is operated in the tag mode, the switch 155 floats the second antenna module 153 so that the antenna module 153 may be disabled. If the portable terminal is operated in the read mode, the switch 155 grounds the second antenna module 153 so that the portable terminal radiates a signal from the second amplifier 145 into the air with a magnetic field signal or receives a magnetic field signal from the outside to output to the NFC module 140.

As described above, the antenna assembly 150 controls the operation of the second antenna module 153 according to whether the portable terminal is operated in the tag mode or the read mode. Therefore, the antenna assembly 150 does not perform unnecessary signal transmission and reception, which allows its parts to elongate their life span and to stably operate. It should be understood that the antenna assembly 150 also performs signal transmission and reception properly in a particular mode.

In the following description, a path formed according to the modes described above is explained in more detail with reference to FIGS. 4A and 4B.

Figure 4A:
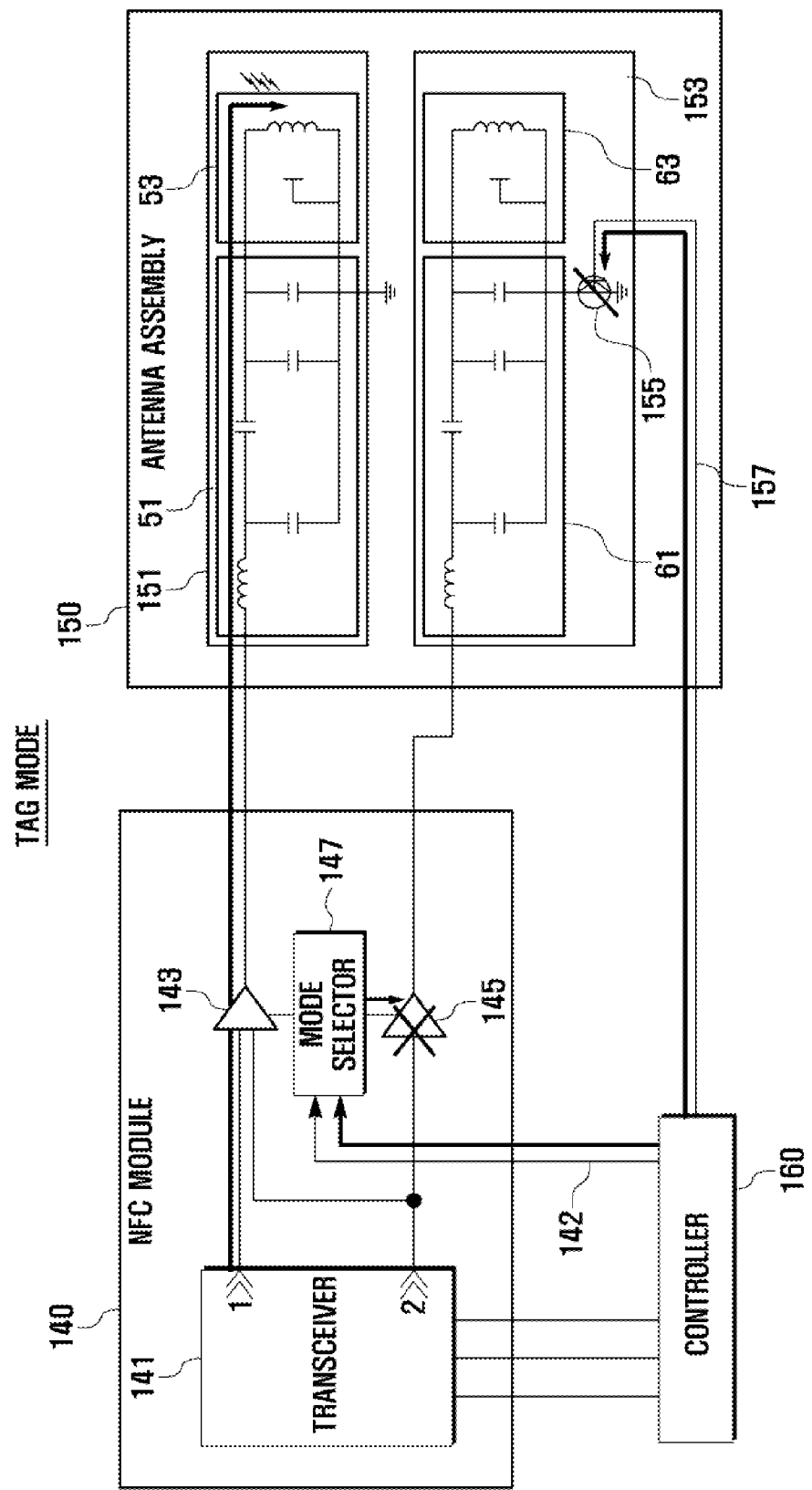
FIG. 4A is a schematic block diagram illustrating a path formed between an NFC module and an antenna assembly, when a portable terminal is operated in a tag mode, according to an exemplary embodiment of the present invention.

FIG. 4A is a schematic block diagram illustrating a path formed between an NFC module and an antenna assembly, when a portable terminal is operated in a tag mode, according to an exemplary embodiment of the present invention. FIG. 4B is a schematic block diagram illustrating a path formed between an NFC module and an antenna assembly, when a portable terminal is operated in a read mode, according to an exemplary embodiment of the present invention.

Figure 4B:
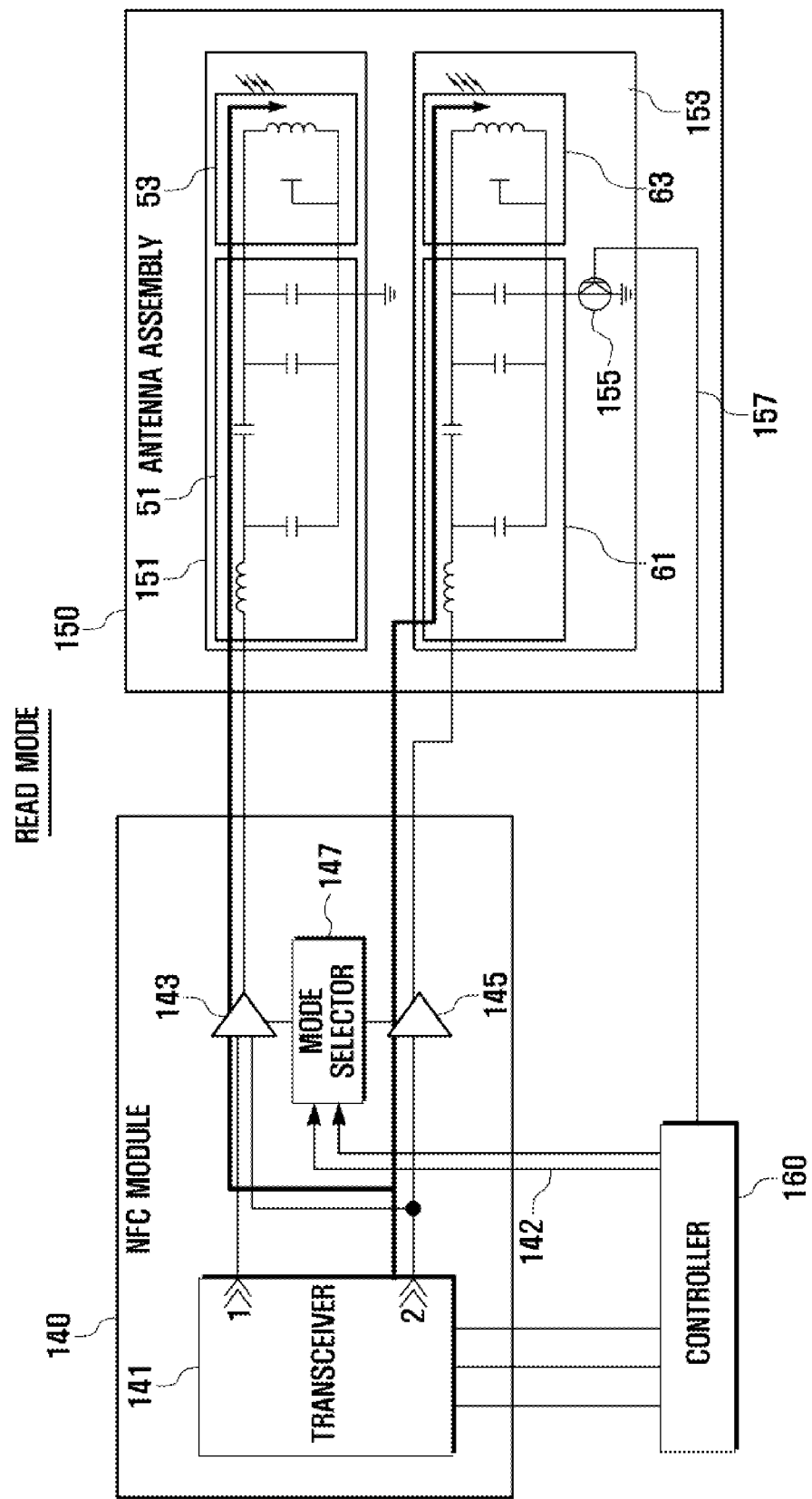
FIG. 4B is a schematic block diagram illustrating a path formed between an NFC module and an antenna assembly, when a portable terminal is operated in a read mode, according to an exemplary embodiment of the present invention.

As illustrated in FIGS. 4A and 4B, the portable terminal may be implemented in such a way that, while the portable terminal does not allow power to be supplied to the first amplifier 143 and the second amplifier 145, if the portable terminal is operated in the tag mode, the portable terminal supplies power to the first amplifier 143 but cuts power to the second amplifier 145. The portable terminal may also be implemented in such a way that, in a state where the portable terminal cuts power to the first amplifier 143 and the second amplifier 145, if the portable terminal is operated in the read mode, a switch 155 may switch on power to supply to the first amplifier 143 and the second amplifier 145. In an exemplary implementation, a default state is that power is supplied to the first amplifier 143 and the second amplifier 145.

The switch 155, located between the second antenna module 153 and ground, may be implemented as an N-type switch, to open between the second antenna module 153 and ground in a state where an additional signal provision does not occur in the tag mode. It should be understood that the switch 155 may also be implemented as a P-type switch. In the case of the P-type switch, in the tag mode, the controller 160 provides a signal to the switch 155 to open between the second antenna module 153 and ground. In the following description, the present invention is explained based on the N-type switch that may turn on the second antenna module 153 and ground if the base of the switch receives a signal.

Referring to FIG. 4A, when the portable terminal is operated in the tag mode, the controller 160 controls the mode selector 147 to cut power supplied to the second amplifier 145. That is, when a user sets the portable terminal to be operated in the tag mode, the controller 160 outputs a control signal for cutting power supplied to the second amplifier 145 to the mode selector 147. Accordingly, the mode selector 147 cuts power supplied to the second amplifier 145. However, the first amplifier 143 is still supplied with power. That is, the tag mode is operated by the first amplifier 143. Meanwhile, the controller 160 does not output a signal to the switch 155 to open accordingly between the second antenna module 153 and ground, i.e., to maintain a floating state of the second antenna module 153. That is, while the first antenna module 151 is receiving a magnetic field signal from outside the portable terminal or the NFC module 140 is transmitting a magnetic field signal to outside the portable terminal via the first antenna module 151, the second antenna module 153 remains in a floating state and thus becomes disabled. Therefore, the first antenna module 151 is operated in the tag mode, irrespective of the second antenna module 153.

As described above, the portable terminal cuts power supplied to the second amplifier 145 to maintain the floating state of the second amplifier 145, but forms a path via the first amplifier 143 and the first antenna module 151 to be operated in the tag mode. Therefore, while the portable terminal is operating in tag mode, power supplied to the second amplifier 145 may be saved and interference of the second antenna module 153, not operated during the tag mode, may also be minimized.

As illustrated in FIG. 4B, when the portable terminal is operated in the read mode, the controller 160 does not output a signal to the mode selector 147, so electric power continues to be supplied to the first amplifier 143 and the second amplifier 145. That is, when the portable terminal is set to the read mode to serve as a reader by a menu or hot keys, the controller 160 controls to maintain the power supply state of the first amplifier 143 and the second amplifier 145. The controller 160 also outputs a signal to the N-type switch 155 to conduct between the second antenna module 153 and ground. In this case, the second antenna module 153 may perform signal transmitting and receiving operations similar to the first antenna module 151. Therefore, the controller 160 generates a read signal for reading tags of the other portable terminals, using the NFC module 140, and then outputs the first amplifier 143 and the second amplifier 145, respectively. The first antenna module 151 and the second antenna module 153 then receive the signals output from the first amplifier 143 and the second amplifier 145, convert the signals to magnetic signals, and then radiate the signals to the air, respectively. The first antenna module 151 and the second antenna module 153 also receive magnetic signals from outside the portable terminal and output the magnetic signal to the NFC module 140, respectively. The first antenna module 151 and the second antenna module 153 may be normally operated as an antenna, respectively, if the first antenna module 151 and the second antenna module 153 are connected to the ground terminal.

As described above, when the first amplifier 143 and the second amplifier 145 continue to receive power, and the first antenna module 151 and the second antenna module 153 are set to be operable, the portable terminal may be operated in the read mode using the first antenna module 151 and the second antenna module 153. That is, the portable terminal may transmit magnetic signals to the air or outside the portable terminal, via a first path, including the first amplifier 143 and the first antenna module 151, and a second path including the second amplifier 145 and the second antenna module 153. The portable terminal may generate the second magnetic signal whose strength is higher than that of the first magnetic signal that is transmitted and received in the tag mode, and may radiate the second magnetic signal to the air, via the first antenna module 151 and the second antenna module 153.

In the following description, a method for operating the tag mode and the read mode in a portable terminal is explained, based on an NFC module and an antenna assembly, with reference to FIG. 5.

Figure 5:
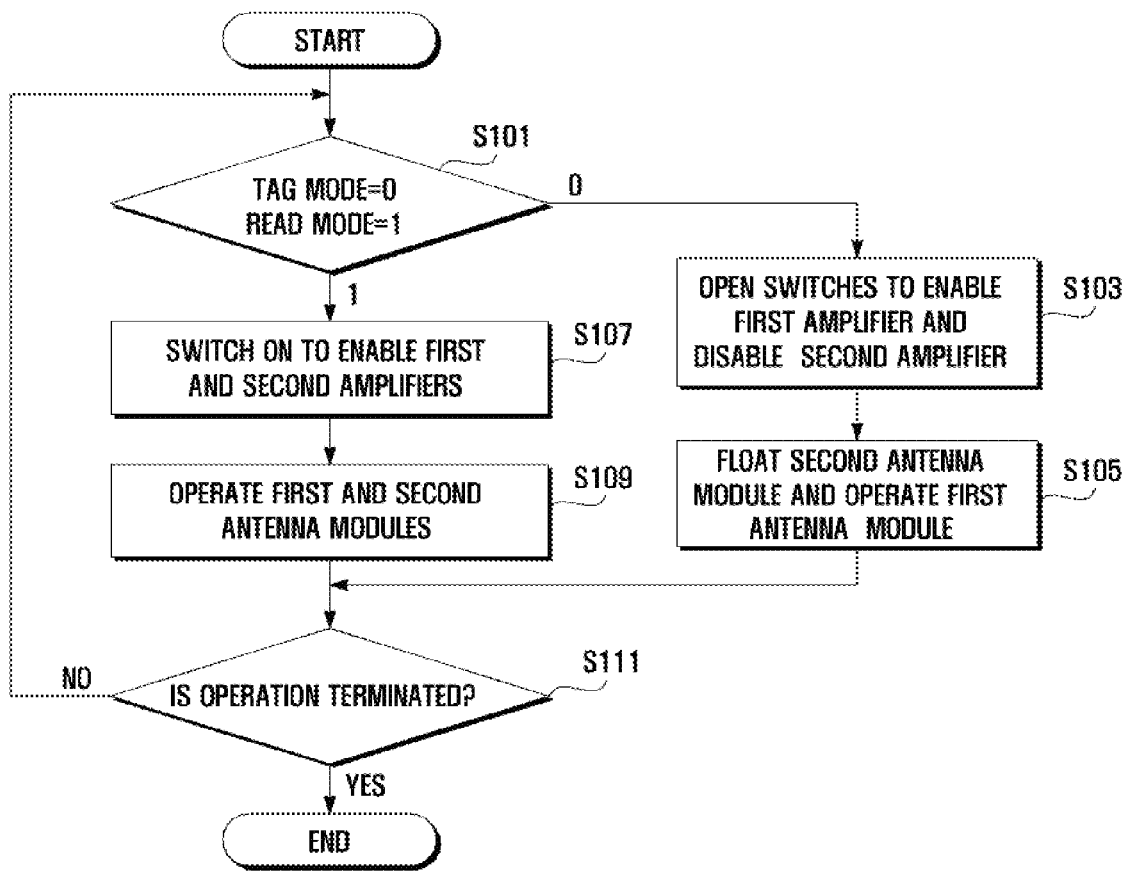
FIG. 5 is a flowchart describing a method for operating a portable terminal including an NFC module in a tag mode and a read mode.

FIG. 5 is a flowchart describing a method for operating a portable terminal including an NFC module in a tag mode and a read mode according to an exemplary embodiment of the present invention.

Referring to FIG. 5, when the portable terminal is turned on, the portable terminal is booted and then activates preset programs. During this process, the controller determines whether to set the NFC module to the tag mode or the read mode, according to the portable terminal user's input, in step S101. The user activates the menu and then inputs a signal corresponding to a selected item for setting the tag mode or the read mode and a signal for activating the selected item, so that the signals may be output to the controller.

When a signal for setting the portable terminal to the tag mode is input in step S101, the controller enables the first amplifier but disables the second amplifier of the NFC module in step S103. The controller generates a control signal to disable the second amplifier and outputs the control signal to the mode selector that controls the operation of the second amplifier. The mode selector may supply and cut power supplied to the first amplifier and the second amplifier. The mode selector may be implemented as one switch unit that may control power supplied to the second amplifier to minimize power consumption.

While the controller is disabling the second amplifier, the controller outputs a control signal to a switch located between the second antenna module and ground to open the circuit between the second antenna module and ground. If the switch is implemented as an N-type switch, which can open between the second antenna module and ground, although the switch does not receive a control signal, the controller may not output a control signal to the switch. On the other hand, if the switch is a P-type switch, the controller generates a control signal for activating the switch and outputs the control signal to the switch.

When the second antenna module is floated in step S103, the NFC module is operated in tag mode using the first amplifier and the first antenna module in step S105.

On the contrary, when a signal for setting the portable terminal to the read mode is input thereto in step S101, the controller continues to supply power to the first amplifier and the second amplifier in step S107. The controller outputs control signals for allowing the first amplifier and the second amplifier to perform a power supplying operation to the mode selector that may allow the first amplifier and the second amplifier to perform a power supplying operation and a power cutting operation. If the NFC module is designed in such a way that the first amplifier and the second amplifier perform a power supplying operation without an additional control signal, the controller may not output the additional control signal to the mode selector. According to the type of switch, the controller outputs a control signal to the switch to operate the second antenna module. That is, if the switch is an N-type switch that opens between the second antenna module and ground, if it does not receive a control signal, the controller outputs a control signal to the switch to short between the second antenna module and ground. If the switch is a P-type switch, the controller does not need to output a control signal to the switch.

The NFC module then operates the first antenna module and the second antenna module using the first amplifier and the second amplifier in step S109.

The controller determines whether the NFC module terminates the operation regarding the tag mode or the read mode in the portable terminal in step S111. If the controller ascertains that a mode terminating signal has not occurred in step S111, the controller returns to step S101 to set the NFC module and the antenna modules to the tag mode or the read mode.

As described above, the tag mode according to the present invention may be designed in such a way to supply power to the portable terminal, although power is not supplied to main parts of the portable terminal, i.e., the main parts are turned off. The main parts, for example, may be a communication module for performing a call, an application module for playing files back, a camera module, and the like. The controller controls a power supply line to supply power to the devices corresponding to the first amplifier and the NFC module tag, although the main power of the portable terminal is turned off.

In an exemplary implementation, although the NFC module operates two amplifiers and the first antenna module and the second antenna module, it should be understood that the NFC module may be modified to include a plurality of amplifiers connected to the first port and the second port and a plurality of antenna modules, where their respective numbers are properly allocated according to the tag mode and the read mode.

As described above, a portable terminal including a Near Field Communication (NFC) module, a tag and a reader, and a method for operating the portable terminal, may be operated in the tag mode, while consuming minimal electric power, and in the read mode, while providing an optimal antenna environment.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A portable terminal operable in a tag mode and a read mode, the portable terminal comprising:
   a Near Field Communication (NFC) module comprising a plurality of amplifiers;
   an antenna assembly comprising a plurality of antenna modules respectively connected to the plurality of amplifiers;
   a mode selector for controlling the plurality of amplifiers to perform a power supplying operation and a power cutting operation; and
   a controller for outputting a control signal to the mode selector according to the tag mode and the read mode,
   wherein, in the tag mode, the controller outputs a control signal to the mode selector to cut power supplied to parts of the plurality of amplifiers, and
   wherein, in the read mode, the controller outputs a control signal to the mode selector to continue to supply power to the plurality of amplifiers.

2. The portable terminal of claim 1, further comprising:
   a switch located between at least one of the antenna modules and ground; and
   a control signal line for transmitting a control signal from the controller to the switch.

3. The portable terminal of claim 2, wherein, in the tag mode, the controller outputs a control signal to the switch to float at least one of the antenna modules.

4. The portable terminal of claim 2, wherein, in the read mode, the controller outputs a control signal to the switch to ground the antenna.

5. The portable terminal of claim 2, wherein the NFC module comprises a first port for performing signal transmitting and receiving operations in the tag mode, and a second port in the read mode.

6. The portable terminal of claim 5, wherein the NFC module comprises a first amplifier and a second amplifier, the first amplifier and the second amplifier being connected to the first port, and the second amplifier being connected to the second port.

7. The portable terminal of claim 6, wherein the antenna assembly comprises the first antenna module, connected to the first amplifier and the second amplifier, and the second antenna module connected to the second amplifier.

8. The portable terminal of claim 5, wherein the first port, the first amplifier and the first antenna module establish a first path during the tag mode.

9. The portable terminal of claim 5, wherein, in the read mode the second port, the first amplifier and the first antenna module establish a first path, and the second port, the second amplifier and the second antenna module establish a second path.

10. The portable terminal of claim 1, wherein the NFC module receives a magnetic signal transmitted from other devices during the tag mode, and transmits a magnetic signal into the air during the read mode.

11. A method for operating a portable terminal in a tag mode or a read mode, wherein the portable terminal comprises a Near Field Communication (NFC) module comprising a first amplifier and a second amplifier, and an antenna assembly comprising a first antenna module and a second antenna module, the method comprising:
    determining whether to set the NFC module to the tag mode or the read mode;
    cutting power supplied to the second amplifier and floating the second antenna when the NFC module is set to the tag mode; and
    supplying power to the first amplifier and the second amplifier and grounding the first antenna module and the second antenna module to ground when NFC module is set to the read mode.

12. The method of claim 11, further comprising establishing, when the NFC module is set to the tag mode, a first path comprising the first amplifier and the first antenna module.

13. The method of claim 11, further comprising receiving, when the NFC module is set to the tag mode, a magnetic field signal transmitted from other terminals via a first path.

14. The method of claim 11, further comprising:
    establishing, when the NFC module is set to the read mode, a first path comprising the first amplifier and the first antenna module; and
    establishing, when the NFC module is set to the read mode, a second path comprising the second amplifier and the second antenna module.

15. The method of claim 11, further comprising transmitting, when the NFC module is set to the read mode, a magnetic field signal to the air via the first path and the second path.

* * * * *